United States Patent [19]

Wiker

[11] Patent Number: 4,481,570
[45] Date of Patent: Nov. 6, 1984

[54] AUTOMATIC MULTI-BANKING OF MEMORY FOR MICROPROCESSORS

[75] Inventor: Gordon A. Wiker, Arcadia, Calif.

[73] Assignee: The United States of America as represented by the Administrator of the National Aeronautics and Space Administration, Washington, D.C.

[21] Appl. No.: 291,645

[22] Filed: Aug. 7, 1981

[51] Int. Cl.³ .................. G06F 13/00; G06F 13/06
[52] U.S. Cl. ........................................... 364/200
[58] Field of Search ... 364/200 MS File, 900 MS File

[56] References Cited

U.S. PATENT DOCUMENTS

| | | | |
|---|---|---|---|
| 3,786,436 | 1/1974 | Zelinski et al. | 364/200 |
| 3,970,999 | 7/1976 | Elward | 364/200 |
| 4,024,508 | 5/1977 | Bachman et al. | 364/200 |
| 4,025,901 | 5/1977 | Bachman et al. | 364/200 |
| 4,044,334 | 8/1977 | Bachman et al. | 364/200 |
| 4,085,442 | 4/1978 | Liaukus et al. | 364/900 |
| 4,149,239 | 4/1979 | Jenkins et al. | 364/200 |
| 4,156,278 | 5/1979 | Wilhite | 364/200 |
| 4,156,279 | 5/1979 | Wilhite | 364/200 |
| 4,158,227 | 6/1979 | Baxter et al. | 364/200 |
| 4,164,786 | 8/1979 | Gollomp | 364/200 |
| 4,164,787 | 8/1979 | Arangurem | 364/200 |
| 4,168,523 | 9/1979 | Chari et al. | 364/200 |
| 4,177,510 | 12/1979 | Appell et al. | 364/200 |
| 4,190,885 | 2/1980 | Joyce et al. | 364/200 |
| 4,229,789 | 10/1980 | Morgan et al. | 364/200 |
| 4,277,826 | 7/1981 | Collins et al. | 364/200 |
| 4,322,795 | 3/1982 | Lange et al. | 364/200 |

*Primary Examiner*—Joseph F. Ruggiero
*Assistant Examiner*—Gary V. Harkcom
*Attorney, Agent, or Firm*—Paul F. McCaul; Thomas H. Jones; John R. Manning

[57] ABSTRACT

A microprocessor system is provided with added memories (1-M) to expand its address spaces beyond its address word length capacity by using indirect addressing instructions of a type having a detectable operations code and dedicating designated address spaces of memory to each of the added memories, one space to a memory. By decoding each operations code of instructions read from main memory into a decoder (16) to identify indirect addressing instructions of the specified type, and then decoding the address that follows in a decoder (20) to determine which added memory is associated therewith, the associated added memory is selectively enabled through a unit (22) while the main memory is disabled to permit the instruction to be executed on the location to which the effective address of the indirect address instruction points, either before the indirect address is read from main memory or afterwards, depending on how the system is arranged by a switch ($S_1$).

12 Claims, 3 Drawing Figures

AUTOMATIC MULTI-BANKING OF MEMORY FOR MICROPROCESSORS

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to a memory system for a microprocessor, and more particularly to expanding the address space of a microprocessor beyond the total set of $2^n$ addresses, where n is the number of bits placed on an address bus to access memory.

A microprocessor operates with instructions from a program stored in memory, often a read-only memory (ROM), to process data stored in read/write memory, commonly referred to as a random access memory (RAM). Typically, a microprocessor operates on an 8-bit basis, although for many operations, two or more 8-bit words, commonly termed bytes, may be combined into a longer word.

A 16-bit address word allows access to $2^{16}$ memory locations, which is equal to precisely 65,536 memory locations. If the microprocessor operates on an 8-bit basis, each location stores 8-bits of data or instructions. It thus follows that to read an instruction that requires an operand, three bytes must be read from memory during three successive clock pulses, a first byte consisting of the operations code (OP CODE), and two bytes consisting of a low-order address byte (LAB) and a high-order address byte (HAB).

The available address space is allocated between a program addressed by a P-counter, and data addressed by the instructions. As noted above, the program may be stored in a ROM (usually of moderate size—less than 8k), while the balance of the approximate total of 64k address space in a RAM is used for data. Both types of memories are addressed by the microprocessor over a 16-bit bus.

In some applications there is significant address space not used, which is to say that the memory is implemented with less than $2^n$ storage locations. But in applications involving data acquisition, processing and storage with microprocessors, it is often desirable to have memory capacity greater than $2^n$. Necessary instructions occupy much of the memory, leaving insufficient space in a memory of $2^n$ locations for handling large amounts of data. To add more storage capacity, the address word must be increased such as from a 16-bit (2-byte) word to a 24-bit (3-byte) word, but that slows data handling for now four clock times are required to fetch an instruction from memory, and some of the added memory capacity is given up to storing the longer addresses. In many real-time applications, the use of longer addresses would so slow computation that the ability to keep up with data flow would be lost, computation could no longer be carried out in real-time, and incoming data could be lost.

OBJECTS AND SUMMARY OF THE INVENTION

An object of this invention is to provide additional memory capacity in a microprocessor system without expanding the system address space, i.e., without lengthening the address word for addressing locations of memory.

Still another object of this invention is to provide the capability of addressing the additional memory with minimal hardware and programming constraints.

Briefly, the present invention is implemented in a microprocessor system having indirect addressing instructions of a detectable type. An address in the instruction points to a location from which an effective address is normally read from the same memory from which the instruction was read. A special instruction decoder determines when an indirect addressing instruction of this detectable type is to be executed. That enables a decoder to determine if the address is associated with an added memory, and also enables an added memory select unit. The effective address may be read from the main memory, or the added memory, depending on how the system is configured, but the effective address points to a memory location in the selected added memory. All memories are connected in parallel to the address bus, but only the main memory is normally enabled. For an indirect addressing instruction of this detectable type, the main memory is disabled and the added memory selected is enabled at the appropriate time to read the effective address from the main memory or the added memory, and to address the added memory selected for the read or write operation indicated by the instruction.

In an exemplary microprocessor system having a 2-byte address and a 1-byte data bus connected to a main memory, the main memory space is divided into a number of pages addressed by the high-order byte of an address, each page consisting of a number of memory locations addressed by the low-order byte of an address. The maximum number of pages in the address space is $2^N$, where N is the number of bits in a byte, and the maximum number of memory locations in a page is similarly $2^N$, a total of $2^{2N}$ address spaces. So in addressing main memory, the high-order byte is decoded to selectively enable a page to be accessed. The low-order byte applied to a decoder effective on all pages will then access only one memory location in the enabled page. To expand the memory capacity of the microprocessor system with a maximum of $2^{(N-1)}$ added memories, where N is the number of bits in a byte, and each added memory is, like the main memory, a maximum of $2^{2N}$ memory locations, additional memories are connected to the high-order byte detector and to the low-order byte on the address bus in parallel with the main memory. All added memories are thus addressed in parallel with the main memory, but only a selected one of the added memories is enabled for access by indirect addressing instructions of a detectable set that uses a single byte address to fetch a 2-byte effective address out of the (ZERO) page of the main memory, or of the selected added memory. In a system which does not use 2-byte addresses, and instead uses a 1-byte address, the maximum number of added memories is $2^N$ instead of $2^{(N-1)}$, but then each memory has only $2^N$ address spaces instead of $2^{2N}$.

Each indirect addressing instruction of the detectable set consists of an OP CODE followed by a single byte ZERO page address. (The ZERO page address is generated by the OP CODE setting HAB to ZERO.) The effective address for the instruction is then read out from the ZERO page address. But if the indirect addressing instruction is of the detectable set *and* the effective address for the instruction is read from a predetermined section of the ZERO page, the single byte address of the indirect addressing instruction is decoded to determine that an added memory is to be accessed for the operation rather than the main memory.

In one embodiment, the direct address is read from the ZERO page of the added memory selected using the one-byte address of the indirect addressing instruction for reading out the low-order address byte (LAB) of the indirect address, and incrementing the one-byte address in the normal manner for all types of indirect addressing instructions to read out the high-order address byte (HAB). In another embodiment, selection of the added memory is delayed to allow the effective address to be read out of the ZERO page of the main memory, and then switching to the selected added memory for the location of the operation. This second embodiment has as an advantage over the first the ability to easily operate on the effective address.

The process of selecting one of the added memories deselects (disables) the main memory so that the effective low- and high-order bytes of the effective address point to a location in one of the added memories, rather than the main memory. In other words, decoding means looks at the address of the location where the effective address is stored, i.e., looks at the single byte of the indirect addressing instruction of the detectable set and determines which added memory is to be accessed by the effective address. The single-byte address following the OP CODE of one of the detectable set of indirect addressing instructions is thus the address of a location in the ZERO page and also the address of a unique one of the added memories. The operation of the instruction is then carried out using the indirect address in an added memory. The only penalty for this expanded memory is the decoding means which is comprised of means for detecting the OP CODE of an indirect addressing instruction of the detectable set, means for decoding the next byte read from memory to determine that it is an address of one of M dedicated memory locations, where M is the actual number of added memories, thus determining that the indirect addressing instruction is to operate on a location in a corresponding one of M added memories having $2^{2N}$ address spaces, and means for selectively enabling the corresponding one of the M added memories for access with a 2-byte address, while at the same time disabling the main memory. As noted above, this switch to an added memory may be effected before or after fetching the indirect address from a ZERO page location, depending upon whether or not the user would prefer to have access to the indirect address in the main memory.

The novel features that are considered characteristic of this invention are set forth with particularity in the appended claims. The invention will best be understood from the following decription when read in connection with the accompanying drawings.

DESCRIPTION OF PREFERRED EMBODIMENTS

Figure 1:
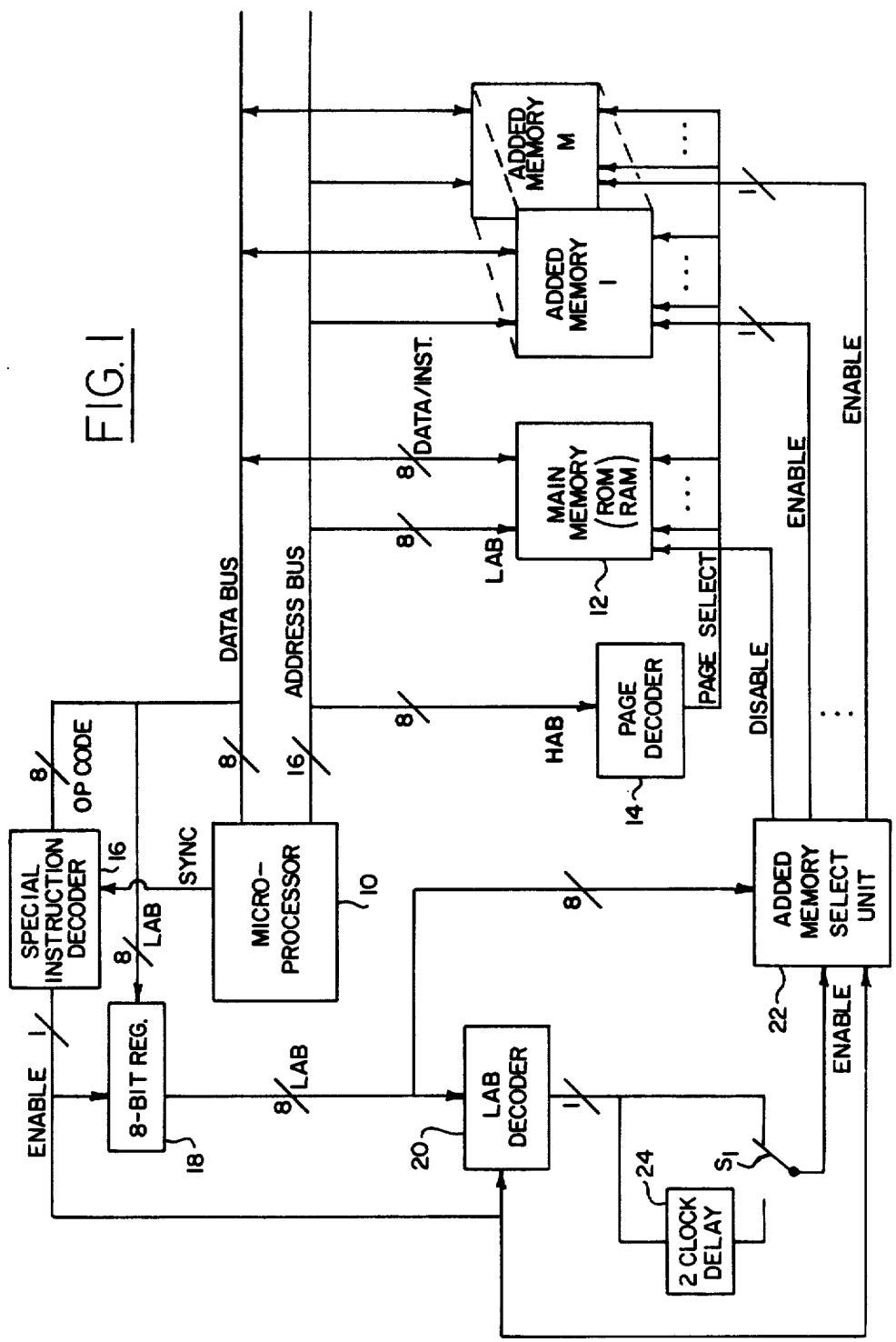
FIG. 1 is a functional block diagram that illustrates both the method and implementation of the present invention.

Referring now to FIG. 1 of the drawings, a microprocessor 10 is provided with a data bus and an address bus in the usual manner. For the purpose of illustrating the general concept of the invention, a specific example will be described based on a 8-bit microprocessor, such as the 6502 of the R6500 family of microprocessors having indirect addressing instructions that use one-byte addresses pointing to a location in the first 256 bytes of memory (ZERO page) to access 2-byte indirect addresses to any location in all available address spaces of a main memory 12, and which operates on a small byte (8-bit) basis. Consequently the data bus is 8-bits wide, the address bus is 16-bits wide, and the memory system has a maximum of $2^{16}=65,536$ address spaces which can be allocated between a ROM for a stored program and a RAM for data.

The main memory can be divided into 256 pages of 256 memory locations per page. A high-order address byte (HAB) is decoded by a page decoder 14 to enable one of the 256 pages of main memory to be accessed by the low-order address byte (LAB). The low-order byte is the only byte of address read from memory following an 8-bit OP CODE of an instruction requiring access to the ZERO page. The high-order address byte is implied by the OP CODE of such an instruction. For absolute addressing instructions a 2-byte address is read from memory immediately after the OP CODE, and for an indirect address instruction, a 2-byte effective address for the operation is read from successive memory locations in ZERO page to which the instruction points. (The single byte address of the indirect address instruction is incremented automatically to read the next ZERO page byte, the high-order byte of the effective address.)

The present invention utilizes indirect addressing instructions of a particular type referred to in the R6500 family of microprocessors as "(INDIRECT), Y." They are all of the set with binary OP CODE XXXX0001, which renders the set easy to detect. However, as will become apparent, any detectable set of indirect addressing instructions could be used according to the present invention to provide for addressing added memories 1 through M consisting of a maximum of $2^n$ memory locations for each added memory, where n is the number of address bits (16 in the exemplary embodiment disclosed) and M is an arbitrary integer equal to or less than $2^{(N-1)}$ and N is the number of bits in a byte.

During normal operation, a program counter in the microprocessor addresses the main memory for the next instruction which is read out of memory one byte at a time. If the instruction requires memory access, more than one clock time is required to read the OP CODE, which is then stored in an instruction register, and an address which is assembled in an address register. In the usual case, two clock times are required to read out two bytes (LAB, HAB), but for an indirect address instruction, four clock times are required, one for the OP CODE, one for an address (LAB) in the ZERO page (the ZERO page is implied by the OP CODE) and two for a 2-byte (LAB, HAB) effective address. In the fifth clock time, the location to which the effective address points is operated on. The present invention provides for the effective address to point to an address in an added memory, or to be actually accessed in one of the added memories, instead of the main memory, in response to a special instruction decoder 16 enabled by a SYNC pulse to receive an OP CODE at the same time the instruction register of the microprocessor receives the OP CODE. Which added memory is to be accessed by the special indirect addressing instruction or to be accessed by the effective address of a special indirect addressing instruction, depends upon the low-order byte (LAB) address in the ZERO page being addressed by the instruction, i.e., LAB read immediately after the OP CODE, a selected code which the user programs when access to an added memory is desired.

In the following description of the invention, it will first be assumed that the effective address is to be fetched from an added memory. Then the alternative of fetching the effective address from main memory will be described with reference to a switch $S_1$ placed in its alternate position.

The output of the decoder 16 is a single bit which enables an 8-bit register 18 to store the next byte of the instruction read from main memory, namely the LAB of the ZERO page location used for indirect addressing. The high-order address byte (HAB) required to address the ZERO page is implied in the OP CODE, so that once the microprocessor has the LAB for addressing the ZERO page, the effective address may be read from the ZERO page, but in this case it will be in an added memory.

A decoder 20 decodes the LAB to determine that it is one of the ZERO page addresses dedicated to the added memories (there is one such LAB for each memory added). Immediately the output of the LAB decoder enables an added memory select unit 22 which in turn disables the main memory 12, and enables a selected added memory, much the same as the page decoder 14 enables a selected page of memory. However, it should be noted that the enable signal to the added memory selected is in addition to the page select signal applied from the page decoder to all memories in parallel. Only the one memory enabled will respond to the page select and low-order address byte (LAB) applied to all memories over the address bus.

The microprocessor and memory system are synchronous. The microprocessor operates with an externally generated clock pulse $\phi_2$ shown in FIG. 2. The $\phi_2$ clock pulses are used in the microprocessor to time its sequence control unit, which in turn provides read/write sequencing control of memory. Consequently, it is to be understood that the added decoding means comprised of the OP CODE decoder 16, 8-bit register 18, LAB decoder 20 and added memory select unit 22 also receive the system clock for synchronous operation, as well as other sequence control signals, although not shown in the drawing. For example, the special instruction decoder 16 receives the same sync control signal that the instruction register of the microprocessor receives to store the OP CODE of each instruction. It is assumed that this decoder 16 has a register for storing the OP CODE of each instruction and that the decoder then generates a single bit output only while a special indirect addressing instruction is present in the register, thus automatically clearing the single bit output when a new instruction is read out of main memory. However, in practice the decoding may be done on the OP CODE while it is on the data bus, and a single bit output stored instead, in which case the single bit is cleared after each instruction has been completed. In either case the single bit output of the decoder signals that this is a special indirect addressing instruction, and that the LAB which follows is to be stored in the register 18 for decoding by the LAB decoder 20.

Figure 2:
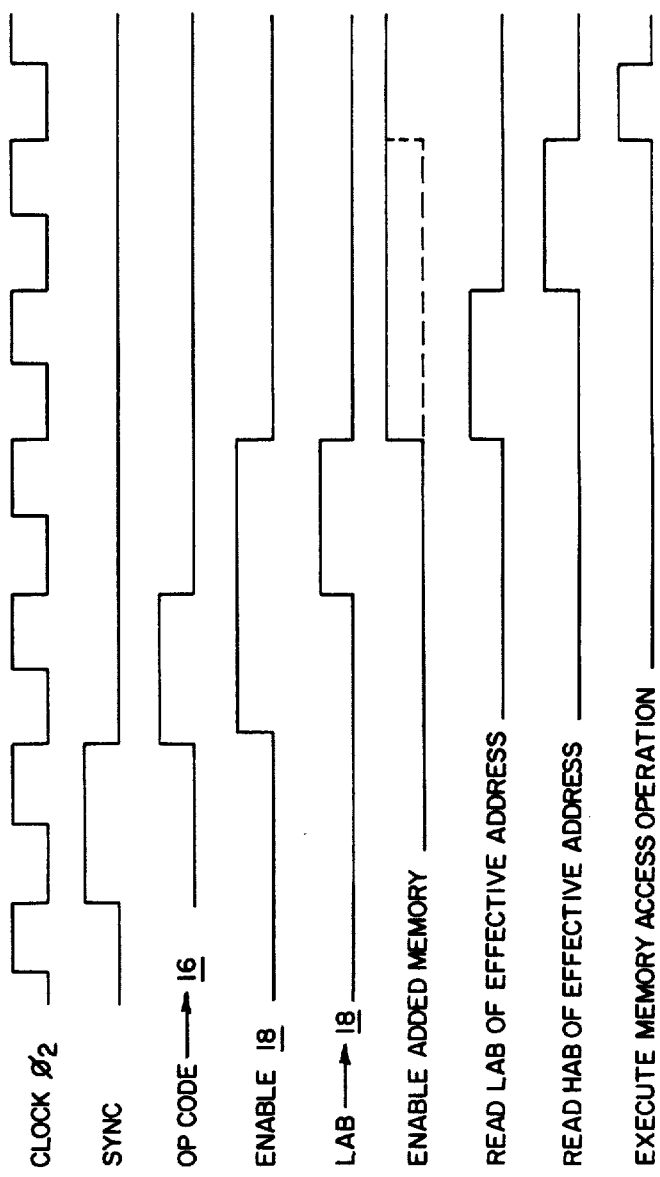
FIG. 2 is a timing diagram useful in understanding the operation of the present invention.

The OP CODE of any one of the set of special indirect addressing instructions decoded enables the register 18 from after the first clock pulse of four to the next clock pulse. That enables the register 18 to store the next byte read from memory on the second clock pulse as shown in FIG. 2. The LAB is immediately decoded by the decoder 20 to enable the added memory select unit 22 to decode the LAB stored in the register 18 and enable one of said memories. Since the LAB is one of the addresses in the ZERO page dedicated to and associated with a unique one of the added memories, decoding the particular LAB indicates which added memory will be enabled. When the third and fourth clock pulses occur, the effective address is read out in two bytes. This occurs automatically, once the main memory is disabled and the added memory selected is enabled because the LAB of the instruction on the address bus is applied to all memories, and the output of the page decoders is applied to all memories. Thus all memories are addressed in parallel in the usual manner, but for a special indirect addressing instruction, the main memory 12 is disabled by the added memory select unit 22, but not until the third clock, so that in response to the third clock, the LAB of the effective address is read from added memory. The HAB of the address is then read on the fourth clock pulse, and the indicated operation (read or write) is performed on the location to which the effective address points.

The first embodiment of the invention illustrated in FIG. 1 by the configuration shown with the switch $S_1$ in the position shown provides both the effective address and the memory location for the operation in added memory. While that may have its obvious advantage of shifting more of the program burden onto the added memory, there is a disadvantage of not having the effective address readily accessible for operation on it. Since a user may want to program operations on the effective address, it may be advisable to have the effective address stored in main memory. In that case the configuration of the present invention is modified by placing the switch $S_1$ in its alternate position such that a 2-clock delay 24 is introduced in the enable signal for the added memory select unit. In that case the third and fourth clocks of the sequence occur while the main memory is still enabled so that the effective address is read from main memory. The delay is indicated in FIG. 2 by a broken line. At the end of that delay, the unit 22 enables an added memory selected, and disables the main memory. Consequently, until the fifth clock pulse, access is to the main memory, then the operation during the fifth clock pulse is on a location in the added memory selected by the unit 22.

Figure 3:
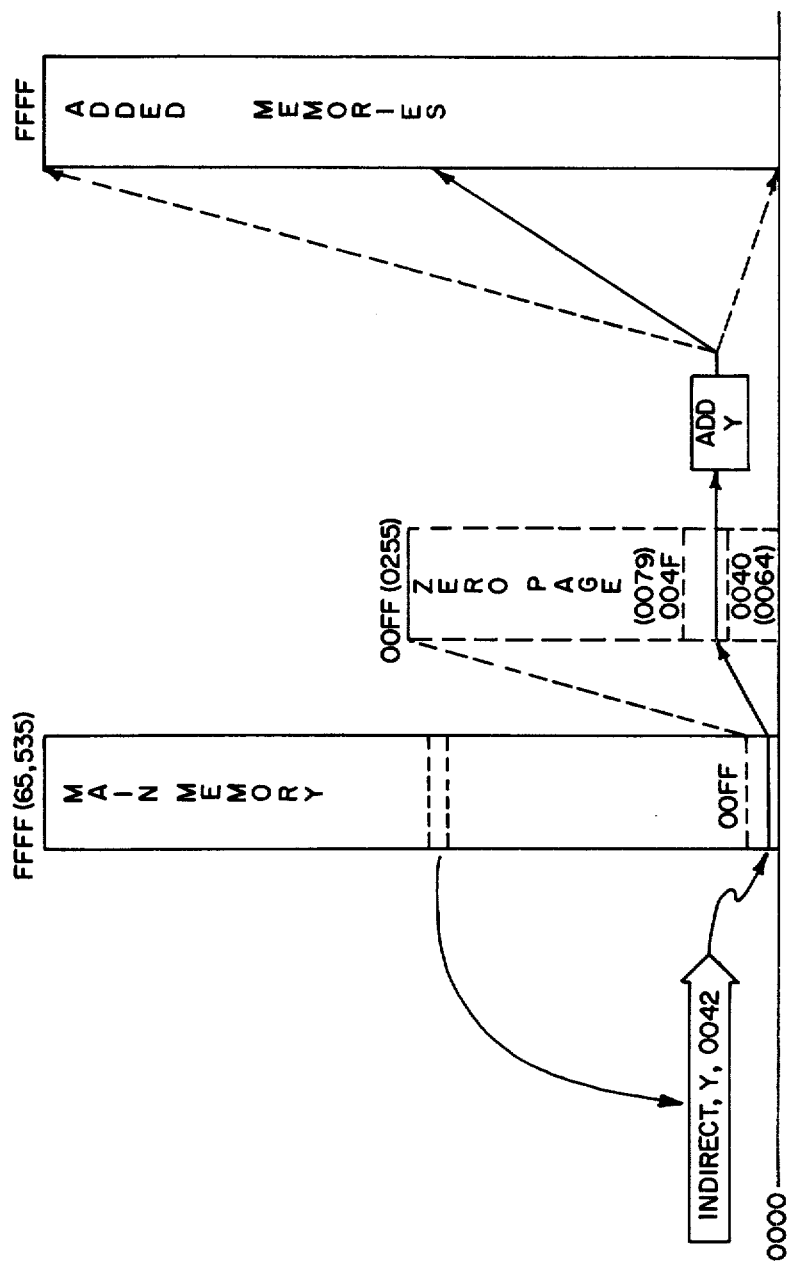
FIG. 3 illustrates diagramatically the memory system involved in the present invention.

FIG. 3 illustrates pictorially the memory system of this second embodiment. As noted hereinbefore, the main memory has a capacity of 65,536 bytes, with 256 bytes per page. Each of the added memories has an identical capacity, and in the example shown there are eight additional memories. The 6502 microprocessor addresses are called in the hexidecimal mode (base sixteen), with digit symbols 0 through 9 and A through F. For clarity of the example, the address is shown in only one byte, namely the LAB. Thus an address of 0040 represents the address number 0064 (in decimal notation) of one page. The decimal equivalents of the hexidecimal addresses are shown in parentheses in FIG. 3.

All addresses on the zero page (shown expanded) of the main memory are within the range of 0000 to 00FF (0000 to 0255). If an instruction is executed with an address within this range, the operation called for will be carried out unchanged on the contents of any location on that page—in the usual manner. In the standard mode of operation of the 6502, this would also be true for all indirect commands. However, the inclusion of decoding means for recognizing the special indirect addressing instructions will cause the effective address read from the ZERO page of main memory to point to a location in an added memory associated with the LAB of the instruction. This effective address may have some unique value (Y) added to it so that in fact the operation of the instruction is on the location of the effective address plus Y added to its HAB-LAB, in addition to having the effective address available in main memory for the user to program changes in that effective address. For the first embodiment (switch $S_1$ in position shown) the expanded ZERO page shown in FIG. 3 is not in main memory, but in the added memory selected. A section of the ZERO page shown expanded extends from 0040 to 004F (0064 to 0079, in decimal notation) for a total of eight special address locations, each dedicated to one added memory. Hence any indirect addressing OP CODE followed by an address located in this section will cause the address stored at that location to be put on the address bus. Specifically, if the command taken from a location in main memory is "Indirect, Y," with the single address 0042 (0066), then the contents of location 0042-0043 on ZERO page are added to the contents of the Y register and the result is put on the address bus. If the Y register held a 0001 at the time, then the address held in 0042-0043 would be increased by one and put on the address bus. The machine would thus go to that new address in the added memory associated with 0042 to carry out the instruction.

Although particular embodiments of the invention have been described and illustrated herein, it is recognized that modifications and variations may readily occur to those skilled in the art. Consequently, it is intended that the claims be interpreted to cover such modifications and equivalents.

What is claimed is:

1. In a microprocessor system having a main memory for storing a program and data, said program including a set of indirect addressing instructions of a specified type, each having a detectable operations code accompanied by an address pointing to a memory location containing an effective address of a memory location on which the instruction is to operate, apparatus for expanding the memory address spaces of said system beyond its address word length capacity comprising a plurality of added memories connected in parallel with said main memory, each associated with a different address pointing to a memory location from which an effective address is to be read from instructions of said set, means for decoding the operations code of instructions, and means responsive to said operations code decoding means, when said decoding means decodes an operations code for an instruction of said set of indirect addressing instructions of said specified type, for decoding the pointing address which accompanies an operations code of an instruction of said set, and means responsive to said address decoding means for disabling said main memory and enabling a selected one of said added memories to cause the effective address of the instruction to be operative in accessing an added memory associated with the pointing address of an instruction of said set, when said decoding means decodes an operations code for an instruction of said set of indirect addressing instructions of said specified type, and for not disabling said main memory, and not enabling any added memory, when said decoding means does not decode an operations code for an instruction of said set of indirect addressing instructions of said specified type.

2. Apparatus as defined in claim 1 wherein said enabling means is effective to enable said added memory before said effective address is read.

3. Apparatus as defined in claim 1 including means for delaying said enabling means from enabling said added memory until after said effective address is read.

4. In a microprocessor system capable of executing indirect addressing instructions of a specified type, a method of expanding the system memory beyond its address word length capacity with memories added in parallel with the main memory of the system, said added memories being normally disabled, comprising the steps of associating each added memory with a different location address in said main memory, decoding the operations code of each instruction read from said main memory to determine if it is of the specified indirect addressing type, and if of said type, decoding the address in the instruction that includes the operations code in an instruction of said type to select an associated added memory, and in response to decoding the operations code of an instruction of said specified type, enabling the selected added memory while disabling said main memory to cause the indirect address instruction to be executed utilizing a memory location in the selected added memory, and if not of said specified indirect addressing type, allowing the address of the instruction to access the main memory, whereby memories can be added without requiring special preliminary instruction to be executed before the added memory may be accessed by an indirect addressing instruction of the specified type.

5. A method as defined in claim 4 wherein said address associated with said operations code of an indirect addressing instruction of said specified type points to a memory location containing the address of an effective address for the instruction, and where said added memory is enabled only after said effective address is read whereby said effective address is read from said main memory.

6. A method as defined in claim 4 wherein said address associated with said operations code of an indirect addressing instruction of said specified type points to a memory location containing the address of an effective address for the instruction, and where said added memory is enabled before said effective address is read whereby said effective address is read from said added memory.

7. In a microprocessor system having an address bus for a number 2N of bits in an address for a predetermined maximum number $2^{2N}$ of address spaces, each address space corresponding to a word storage location in a main memory of N bits, apparatus for addressing added memories, each added memory being connected in parallel with said main memory, but normally disabled, and having a number of word storage locations corresponding to said main memory, said microprocessor system using indirect addressing instructions comprised of an operations code and an N-bit address to a location in a predetermined page in said main memory where the pointer to a location in a page of memory storing an effective address may be found, said pointer consisting of an N-bit word designating a page location and an N-bit word designating a page of memory, the combination comprising means for decoding the operations code of instructions of a predetermined set of said indirect addressing instructions, means responsive to said operations code decoding means for decoding the N-bit address which follows an operations code of an instruction of said set, and means responsive to said address decoding means for enabling a selected one of said added memories to cause the effective address of the instruction to be read from two successive memory locations, the first of which is addressed by said instruction address, to be operative in accessing an added memory associated with said instruction address.

8. Apparatus as defined in claim 7 wherein said enabling means is effective immediately upon decoding said instruction address, whereby said added memory is enabled before said effective address is read in two bytes from said predetermined page in an added memory.

9. Apparatus as defined in claim 7 including means for delaying said enabling means from enabling said added memory until after said effective address is read in two bytes from said predetermined page in said main memory.

10. In a microprocessor system having an address bus for a number 2N of bits in an address for a predetermined maximum number $2^{2N}$ of address spaces, each address space corresponding to a word storage location in a main memory of N bits, a method for addressing added memories, each added memory being connected in parallel with said main memory, but normally disabled, and having a number of word storage locations corresponding to said main memory, said microprocessor system using indirect addressing instructions comprised of an operations code and an N-bit address to a location in a predetermined page in said main memory where the pointer to a location in a page of memory storing an effective address may be found, said pointer consisting of an N-bit word designating a page location and an N-bit word designating a page of memory, comprising the steps of, dedicating unique locations in said predetermined page in main memory to indicate the use of different associated ones of said added memories, programming selected indirect addressing instructions of a specified type with an N-bit address following an operations code, which address corresponds to a memory location in said predetermined page of main memory associated with a selected one of said added memories, decoding the operations code of each instruction being executed by said microprocessor system to detect an indirect addressing instruction of said specified type, in response to decoding said operations code, decoding the N-bit address which follows the operations code of an indirect addressing instruction of said specified type to determine if it is to one of said locations dedicated to an added memory before reading from said N-bit address of said predetermined page, and the next address in sequence, an effective address for the indirect addressing instruction, said effective address comprising an N-bit page address, and an N-bit location address, and in response to decoding the N-bit address which follows the operations code of an indirect addressing instruction of said specified type for an address to a location dedicated to an added memory, enabling one of said memories associated with the one of said dedicated locations decoded and disabling said main memory while addressing memory for operation of said indirect addressing instruction on a location in added memory.

11. A method as defined in claim 10 wherein said added memory is not enabled until said effective address is read from main memory, whereby said effective address is readily accessible for modification by said microprocessor system under programmed control.

12. A method as defined in claim 10 wherein said added memory is enabled immediately upon decoding an address to a location dedicated to an added memory, whereby said effective address is read from said added memory to relieve said main memory of the burden of storing said effective address.

* * * * *